(12) United States Patent
Mastrocola et al.

(10) Patent No.: US 10,131,332 B1
(45) Date of Patent: Nov. 20, 2018

(54) SYSTEM AND METHOD FOR EMI REDUCTION IN AN ELECTRIC BRAKING SYSTEM

(71) Applicant: Goodrich Corporation, Charlotte, NC (US)

(72) Inventors: Naison E Mastrocola, Goshen, CT (US); Scott R Durkee, New Haven, VT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/658,163

(22) Filed: Jul. 24, 2017

(51) Int. Cl.
| | |
|---|---|
| H02M 7/5387 | (2007.01) |
| H02P 6/00 | (2016.01) |
| B60T 8/173 | (2006.01) |
| B60T 8/17 | (2006.01) |
| B60T 8/172 | (2006.01) |
| B60T 13/74 | (2006.01) |
| H02P 6/15 | (2016.01) |
| H02P 6/16 | (2016.01) |
| H02P 6/08 | (2016.01) |

(52) U.S. Cl.
CPC .............. *B60T 8/173* (2013.01); *B60T 8/172* (2013.01); *B60T 8/1703* (2013.01); *B60T 13/741* (2013.01); *B60T 13/746* (2013.01); *H02P 6/085* (2013.01); *H02P 6/15* (2016.02); *H02P 6/16* (2013.01); *H02M 7/5387* (2013.01)

(58) Field of Classification Search
CPC ...... B60T 8/174; B60T 13/746; B60T 13/741; B60T 8/172; B60T 8/1703; B60T 8/173; H02P 6/085; H02P 6/16; H02P 6/15; H02M 7/5387
USPC ........................................ 318/400.17, 400.01
See application file for complete search history.

(56) References Cited

U.S. PATENT DOCUMENTS

| | | | | |
|---|---|---|---|---|
| 7,612,522 | B2 * | 11/2009 | Williams | ............ H02M 7/5387 318/400.01 |
| 8,796,969 | B2 | 8/2014 | Goetz | |
| 2016/0268949 | A1 | 9/2016 | Benn | |

FOREIGN PATENT DOCUMENTS

| | | |
|---|---|---|
| CN | 103929179 | 7/2014 |

* cited by examiner

*Primary Examiner* — Bentsu Ro
*Assistant Examiner* — Zemenay Truneh
(74) *Attorney, Agent, or Firm* — Snell & Wilmer L.L.P.

(57) ABSTRACT

A controller for a brake may comprise a tangible, non-transitory memory configured to communicate with the controller, the tangible, non-transitory memory having instructions stored thereon that, in response to execution by the controller, cause the controller to perform operations comprising receiving, by the controller, a three-phase signal indicating a first duty cycle for a first phase signal, a second duty cycle for a second phase signal, and a third duty cycle for a third phase signal, determining, by the controller, a minimum value based upon the first phase signal, the second phase signal, and the third phase signal, and converting, by the controller, the minimum value to a zero value.

20 Claims, 8 Drawing Sheets

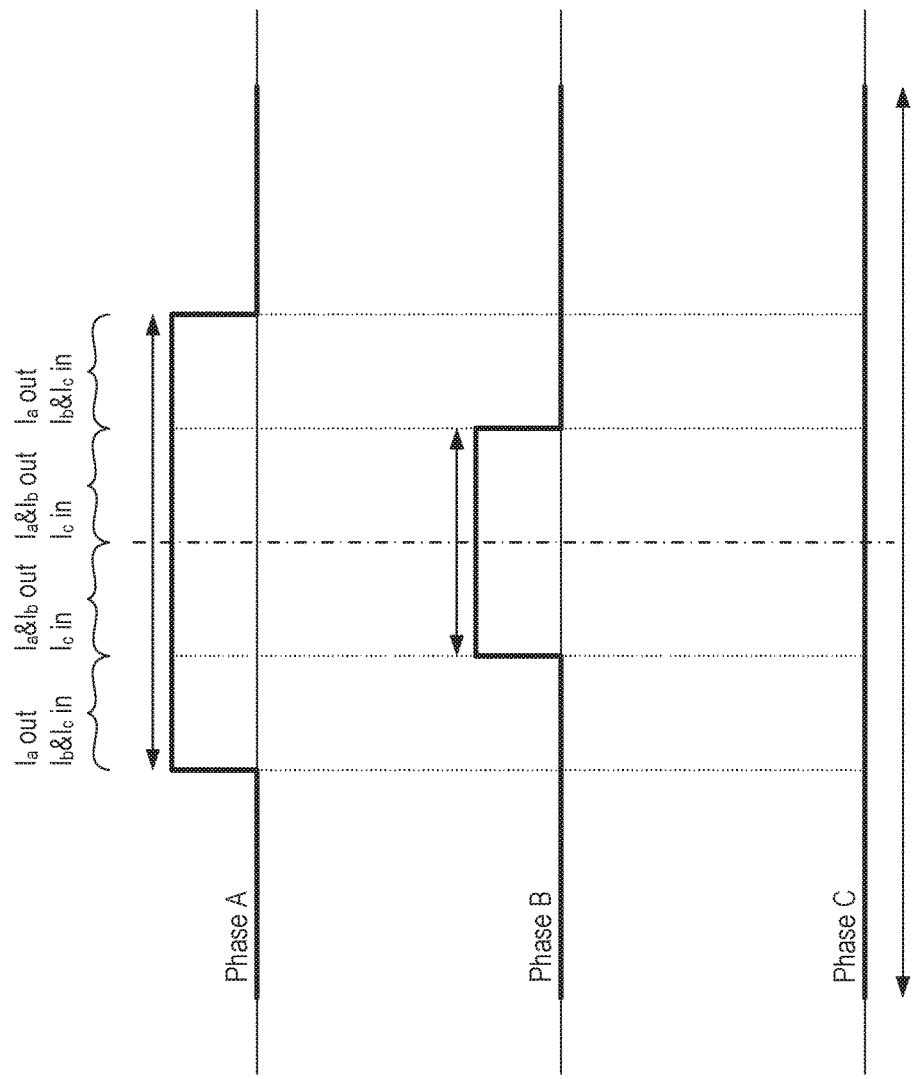

SYSTEM AND METHOD FOR EMI REDUCTION IN AN ELECTRIC BRAKING SYSTEM

FIELD

The present disclosure relates to electric brakes, and, more specifically, to systems and methods for controlling electric brakes.

BACKGROUND

Aircraft often include one or more landing gear that comprise one or more wheels. A braking system is coupled to the wheel(s) in order to decelerate or park the aircraft. For electric braking systems, a motor may be located at the wheels of the landing gear and a controller is typically located in the fuselage of the aircraft. Wires may extend between the fuselage and the braking system at the location of the wheels. Electric signals may be sent and received between the motor and the controller.

SUMMARY

A controller for a brake is disclosed herein, in accordance with various embodiments. The controller may comprise a tangible, non-transitory memory configured to communicate with the controller, the tangible, non-transitory memory having instructions stored thereon that, in response to execution by the controller, cause the controller to perform operations comprising receiving, by the controller, a three-phase signal indicating a first duty cycle for a first phase signal, a second duty cycle for a second phase signal, and a third duty cycle for a third phase signal, determining, by the controller, a minimum value based upon the first phase signal, the second phase signal, and the third phase signal, and converting, by the controller, the minimum value to a zero value.

In various embodiments, at least one of the first phase signal, the second phase signal, and the third phase signal may comprise the minimum value. The three-phase signal may be converted to an edge reduced command signal in response to the converting. The controller may output the edge reduced command signal to a bridge inverter. The controller may be further configured to multiply at least one of the first duty cycle, the second duty cycle, or the third duty cycle by one half of a direct current (DC) voltage. The controller may further comprise a field oriented control (FOC) logic. The controller may further comprise an edge reduction module configured to receive the three-phase signal from the FOC logic. The controller may control a motor via the edge reduced command signal.

A brake arrangement is disclosed herein, in accordance with various embodiments. The brake arrangement may comprise a motor, a controller in electronic communication with the motor, and a tangible, non-transitory memory configured to communicate with the controller, the tangible, non-transitory memory having instructions stored thereon that, in response to execution by the controller, cause the controller to perform operations comprising: receiving, by the controller, a motor angular position; calculating, by the controller, a three-phase signal indicating a first duty cycle for a first phase signal, a second duty cycle for a second phase signal, and a third duty cycle for a third phase signal; determining, by the controller, a minimum value based upon the first phase signal, the second phase signal, and the third phase signal; and converting, by the controller, the minimum value to a zero value.

In various embodiments, the brake arrangement may further comprise a current sensor, in communication with the controller, and a position sensor, in communication with the controller and configured to measure the motor angular position. The controller may comprise an edge reduction module, and a field oriented control (FOC) logic. The brake arrangement may further comprise an electro-mechanical brake actuator (EBA), wherein the motor is for the EBA. The three-phase signal may be converted to an edge reduced command signal in response to the converting. The tangible, non-transitory memory may cause the controller to perform operations further comprising sending, by the controller, the edge reduced command signal to the motor. The EBA may be configured to apply a force to a pressure plate according to the edge reduced command signal. The controller may comprise an electro-mechanical brake actuator controller. The tangible, non-transitory memory may cause the controller to perform operations further comprising receiving, by the controller, a voltage command. The three-phase signal may be calculated based upon the voltage command and the motor angular position.

A method of controlling a motor is disclosed herein, in accordance with various embodiments. The method may comprise receiving, by a controller, a motor angular position; calculating, by the controller, a three-phase signal indicating a first duty cycle for a first phase signal, a second duty cycle for a second phase signal, and a third duty cycle for a third phase signal; determining, by the controller, a minimum value based upon the first phase signal, the second phase signal, and the third phase signal; and converting, by the controller, the minimum value to a zero value.

In various embodiments, the method may further comprise sending, by the controller, an edge reduced command signal to the motor, wherein the three-phase signal is converted to the edge reduced command signal in response to the converting, and rotating a motor shaft in response to the sending.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 4B illustrates a first duty cycle, a second duty cycle, and a third duty cycle, according to the three-phase signal of FIG. 4A, in accordance with various embodiments;

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Aircraft often include one or more landing gear that comprise one or more wheels. A braking system is coupled to the wheel(s) in order to decelerate or park the aircraft. For electric braking systems, a motor may be located at the wheels of the landing gear and a controller is typically located in the fuselage of the aircraft. Wires may extend between the fuselage and the braking system at the location of the wheels. Electric signals may be sent and received between the motor and the controller. Each time that a current signal is abruptly turned on, electromagnetic interference (EMI) emissions may be emitted from the wiring. Systems and methods disclosed herein may be useful for electric brake systems, and more particularly, for reducing EMI emissions in electric brake systems. A controller for a brake, as described herein, may maintain one of the three phase signals of a three-phase command signal at a zero-value at any given time to reduce the number of edges in the command signal. In this regard, the current signal between the controller and the electronic brake actuator motor may have a reduced number of steps, thereby reducing EMI emissions in the electric brake system.

Figure 1:
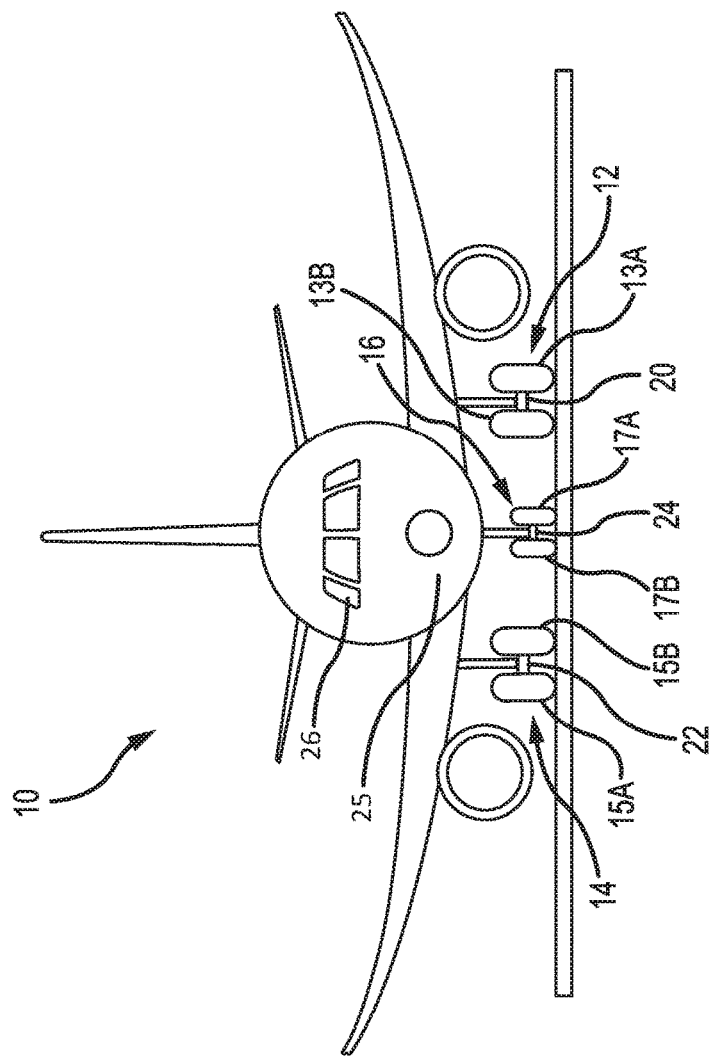
FIG. 1 illustrates an aircraft, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by an axle 20. Landing gear 14 may include wheel 15A and wheel 15B coupled by an axle 22. Landing gear 16 may include nose wheel 17A and nose wheel 17B coupled by an axle 24. The nose wheels differ from the main wheels in that the nose wheels may not include a brake and/or a wheel speed transducer. An XYZ axes is used throughout the drawings to illustrate the axial (y), forward (x) and vertical (z) directions relative to axle 22. Aircraft 10 may comprise a controller 25 and pilot controls 26. Landing gear system 14 may be in communication with controller 25 and/or pilot controls 26 and may receive commands from controller 25 and/or pilot controls 26, for example, to apply pressure to a brake stack.

Figure 2A:
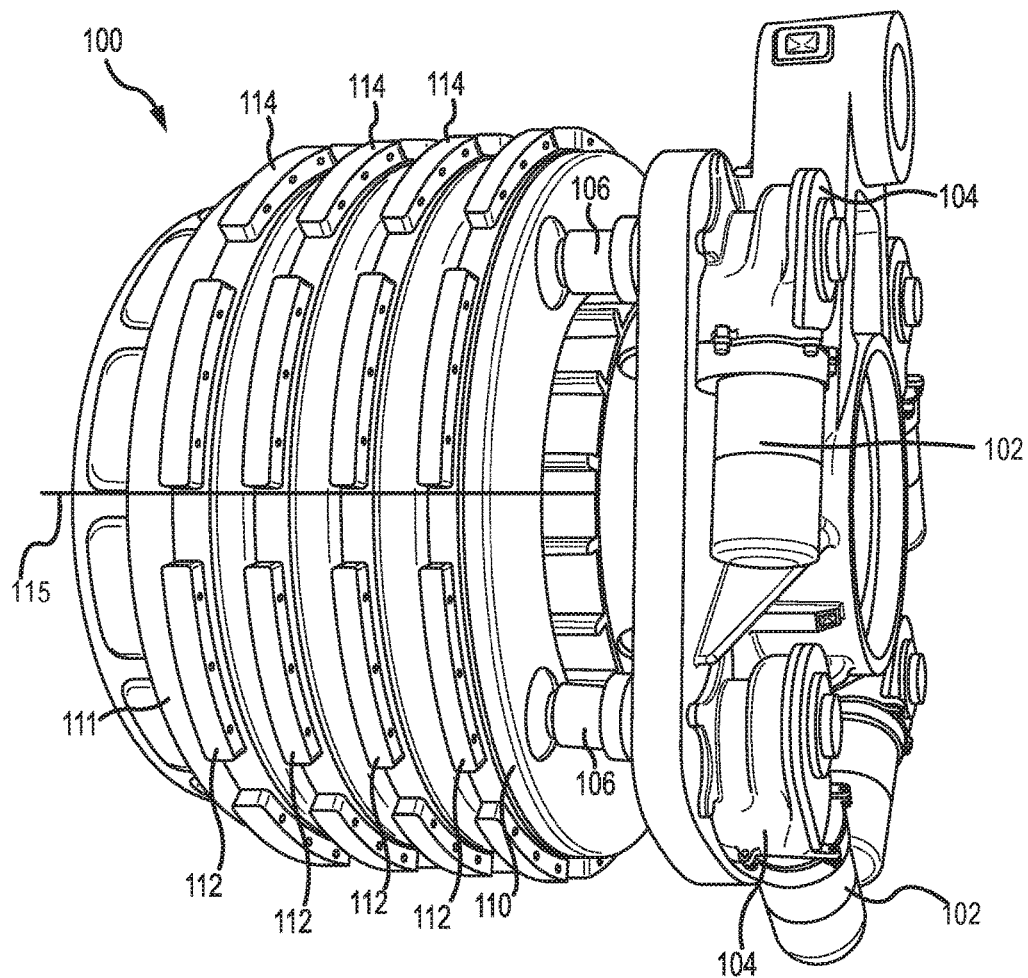
FIG. 2A illustrates an aircraft brake, in accordance with various embodiments.

FIG. 2A illustrates an aircraft brake 100 in accordance with various embodiments.

Aircraft brake 100 may include a plurality of actuator motors 102, a plurality of electromechanical brake actuators 104, a plurality of ball nuts 106, an end plate 111 and a pressure plate 110, and a plurality of rotating discs 112 and stators 114 positioned in an alternating fashion between end plate 111 and pressure plate 110. Rotating discs 112 may rotate about an axis 115 and the stators 114 may have no angular movement relative to axis 115. Wheels may be coupled to rotating discs 112 such that a linear speed of the aircraft is proportional to the angular speed of rotating discs 112. As force is applied to pressure plate 110 towards end plate 111 along the axis 115, rotating discs 112 and stators 114 are forced together in an axial direction. This causes the rotational speed of rotating discs 112 to become reduced (i.e., causes braking effect) due to friction between rotating discs 112, stators 114, end plate 111 and pressure plate 110. When sufficient force is exerted on rotating discs 112 via pressure plate 110, the rotating discs 112 will stop rotating.

Figure 2B:
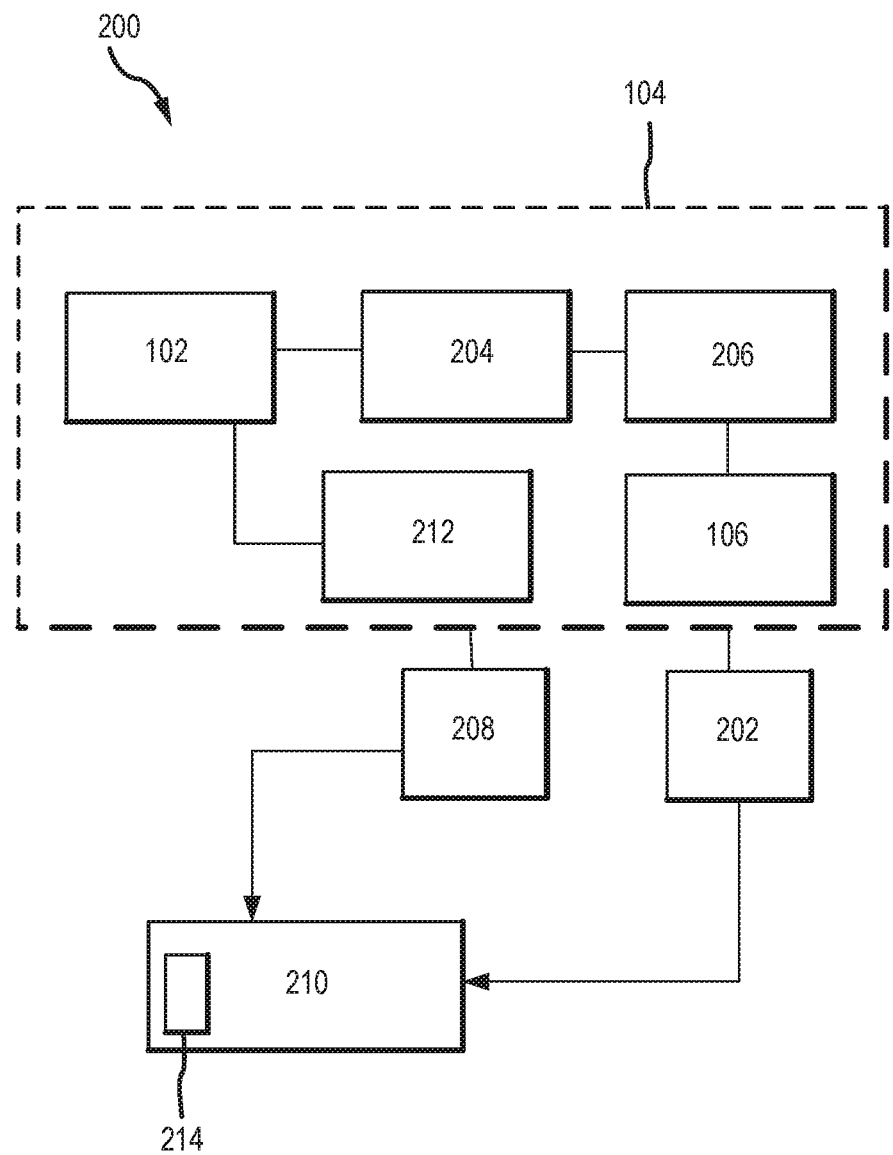
FIG. 2B illustrates a block diagram of an electromechanical brake actuator control system, in accordance with various embodiments.

In order to exert this force onto pressure plate 110, actuator motor 102 may cause electromechanical brake actuator (EBA) 104 to actuate. In various embodiments, actuator motor 102 may be a brushless motor, such as a permanent magnet synchronous motor (PMSM), a permanent-magnet motor (PMM) or the like. In various embodiments, and with reference to FIG. 2B, electromechanical brake actuator 104 may be coupled to or otherwise operate a motor shaft 204 and a pressure generating device, such as, for example, a ball screw, a ram, and/or the like. In response to actuation, electromechanical brake actuator 104 causes the motor shaft 204 to rotate. Rotation of the motor shaft 204 may cause rotation of a ball screw 206, and rotational motion of the ball screw 206 may be transformed into linear motion of a ball nut 106. With reference again to FIG. 2A, linear translation of ball nut 106 towards pressure plate 110 applies force on pressure plate 110 towards end plate 111.

Electromechanical brake actuator 104 is actuated in response to current being applied to actuator motor 102. The amount of force applied by electromechanical brake actuator 104 is related to the amount of current applied to actuator motor 102. With reference again to FIG. 2B, in various embodiments, an electromechanical brake actuator control system 200 may comprise a current sensor 212 to detect an amount of current provided to actuator motor 102. Current sensor 212 may be in communication with actuator motor 102 and/or with various other components of an electromechanical brake actuator 104, an electromechanical brake actuator control system 200, and/or an aircraft. In various embodiments, current sensor 212 may be disposed on or adjacent to actuator motor 102. However, current sensor 212 may be disposed in any location suitable for detection of electrical current supplied to the actuator motor 102.

Application of current to actuator motor 102 causes rotation of motor shaft 204. In various embodiments, electromechanical brake actuator control system 200 may comprise a position sensor 208. Position sensor 208 may be configured so as to measure the rotational speed and position of motor shaft 204. In various embodiments, position sensor 208 may be disposed in or adjacent to electromechanical brake actuator 104, or on or adjacent to actuator motor 102. However, position sensor 208 may be disposed in any location suitable for detection of the rotational speed and position of motor shaft 204. In various embodiments, position sensor 208 may comprise a resolver, tachometer, or the like.

In various embodiments, electromechanical brake actuator control system 200 may comprise a load cell 202. Load cell 202 may be configured so as to measure the amount of force being applied between ball nut 106 and pressure plate 110. In various embodiments, load cell 202 may be disposed in or adjacent to electromechanical brake actuator 104, or on or adjacent to ball nut 106. In various embodiments, load cell 202 may be disposed on or adjacent to end plate 111. However, load cell 202 may be disposed in any location suitable for detection of the force being applied between ball nut 106 and pressure plate 110. A controller may receive the detected force and rotational speed, and calculate an adjusted force and an adjusted rotational speed based on those detected values. In various embodiments, electromechanical brake actuator control system 200 may comprise an EMI reducing controller (controller) 210.

In various embodiments, controller 210 may comprise a processor. In various embodiments, controller 210 may be implemented in a single controller. In various embodiments, controller 210 may be implemented in multiple controllers and/or processors. Controller 210 may comprise hardware having instructions stored in a tangible, non-transitory memory 214 configured to communicate with controller 210. In various embodiments, controller 210 may be implemented in an electromechanical actuator controller and/or a brake control unit (BCU). In various embodiments, motor 102 may be controlled via controller 210.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 3:
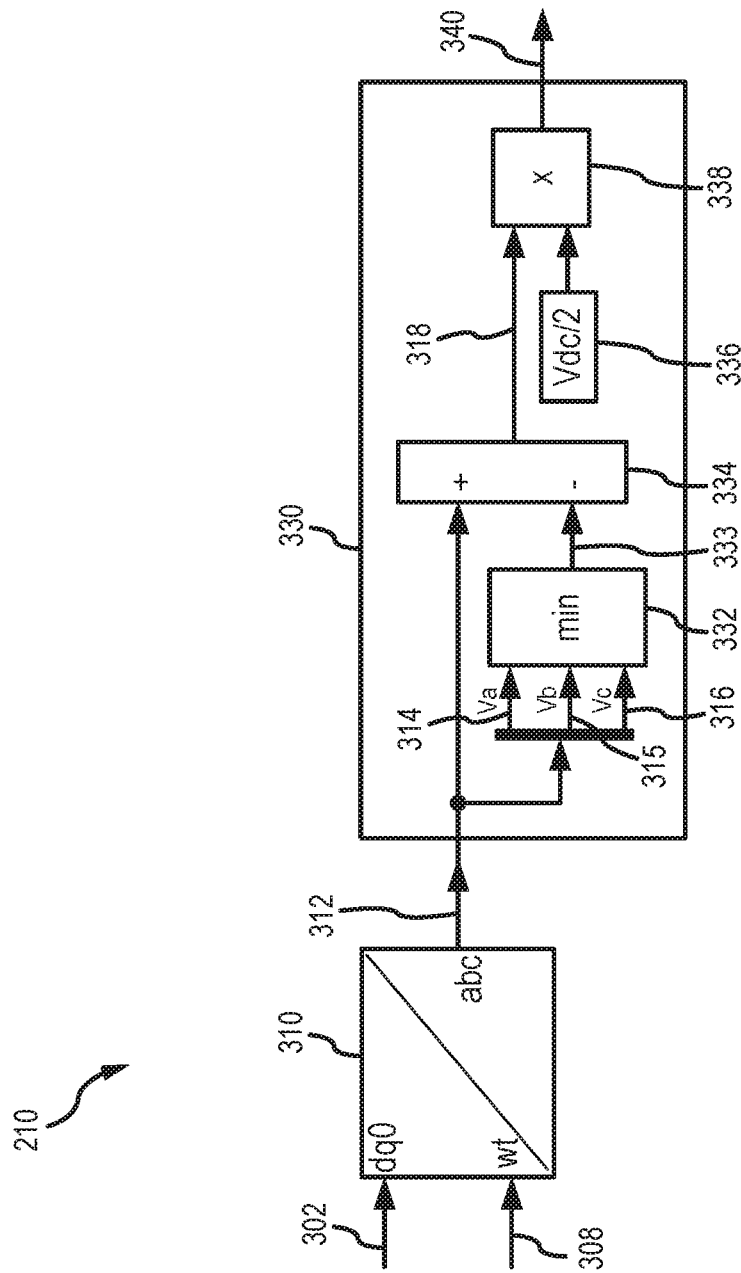
FIG. 3 illustrates a block diagram of a motor controller, in accordance with various embodiments.

With reference to FIG. 3, controller 210 is illustrated, in accordance with various embodiments. Controller 210 may comprise a field oriented control (FOC) logic 310 and an edge reduction module 330. In various embodiments, FOC logic 310 and edge reduction module 330 may comprise instructions stored in a tangible, non-transitory memory 214, with momentary reference to FIG. 2B. FOC logic 310 and edge reduction module 330 may cause controller 210 to perform various operations as described herein.

In various embodiments, FOC logic 310 may receive a voltage command 302 and a motor angular position 308. In various embodiments, voltage command 302 may comprise a direct quadrature zero transform. For example, voltage command 302 may comprise voltage components parsed into a d-axis component (i.e., $V_d$) and a q-axis component (i.e., $V_q$). In various embodiments, motor angular position 308 may comprise an angular position of motor shaft 204, with momentary reference to FIG. 2B. FOC logic 310 may implement a Clarke transform and/or a Park transform to transform voltage command 302 from an alternating current (AC) waveform to a three-phase direct current (DC) signal 312 using motor angular position 308. Stated differently, the FOC logic 310 may convert voltage command 302 from a synchronous reference frame to a non-synchronous reference frame.

In various embodiments, edge reduction module 330 may receive three-phase DC signal 312. Three-phase DC signal 312 may comprise a first phase signal 314 (e.g., Va), a second phase signal 315 (e.g., Vb), and a third phase signal 316 (e.g., Vc). Edge reduction module 330 may determine which of the first phase signal 314, second phase signal 315, and third phase signal 316 comprises the lowest value (i.e., the minimum value). Edge reduction module 330 may subtract the signal having the minimum-value phase signal from the three-phase DC signal 312, thereby converting the minimum-value phase signal to zero. For example, if three-phase DC signal 312 comprised a first phase signal of 50 V, a second phase signal of 20 V, and a third phase signal of 3 V, then edge reduction module 330 may convert the third phase signal from a 3 V signal to a 0 V signal and the edge reduced three-phase DC signal 318 would then comprise a first phase signal of 47 V, a second phase signal of 17 V, and a third phase signal of 0 V. Edge reduction module 330 may multiply the edge reduced three-phase DC signal 318 by half of the DC link voltage (Vdc) 336 and output edge reduced command signal 340 to a motor bridge-inverter.

For example, edge reduction module 330 may comprise a minimum value finder 332, a summing logic 334, and a multiplier 338. Minimum value finder 332 may receive three-phase DC signal 312 and determine a minimum value 333 based upon first phase signal 314, second phase signal 315, and third phase signal 316. Stated differently, minimum value 333 may comprise the minimum value of first phase signal 314, second phase signal 315, and third phase signal 316. Summing logic 334 may receive minimum value 333 from minimum value finder 332 and subtract minimum value 333 from the respective phase of three-phase DC signal 312. Multiplier 338 may multiply edge reduced three-phase DC signal 318 with one half DC link voltage 336 to generate edge reduced command signal 340.

Figure 4A:
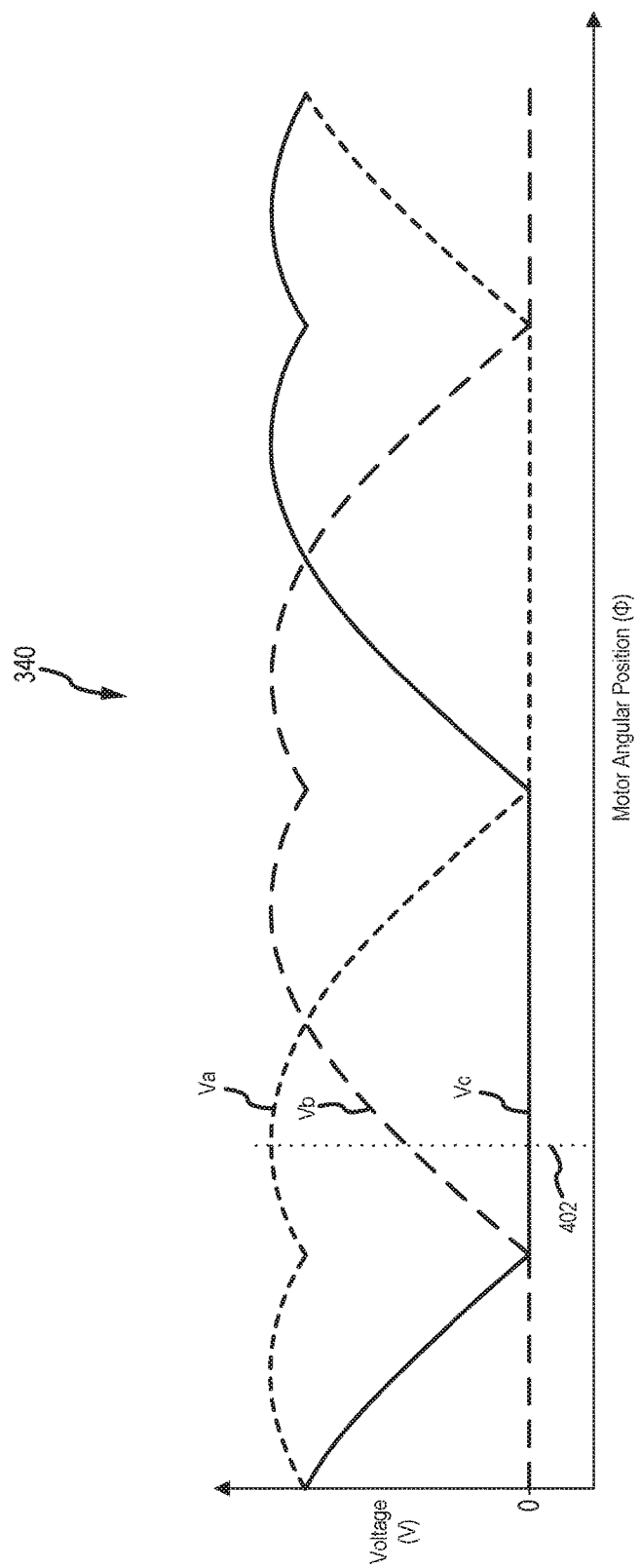
FIG. 4A illustrates a three-phase signal with respect to motor angular position according to the motor controller of FIG. 3, in accordance with various embodiments.

With reference to FIG. 4A, edge reduced command signal 340 is illustrated with respect to motor angular position 308. FIG. 4A depicts edge reduced command signal 340 over one period of motor angular position 308 (e.g., from 0 to 2n). As illustrated, one of the phases comprises a zero-value for any arbitrary motor angular position, thereby reducing the number of edges in edge reduced command signal 340. For example, at motor angular position 402, phase Va comprises a positive voltage corresponding to a first duty cycle, phase Vb comprises a positive voltage corresponding to a second duty cycle, and phase Vb comprises a zero voltage corresponding to a third duty cycle of zero. In this regard, phase Va is illustrated with a short-dashed line, phase Vb is illustrated with a long-dashed line, and phase Vc is illustrates with a solid line.

With reference to FIG. 4B, a duty cycle for each of the first phase, second phase, and third phase signals is illustrated corresponding to a single motor angular position. In this regard, with combined reference to FIG. 3 and FIG. 4B, each of first phase signal 314, second phase signal 315, and third phase signal 316 may indicate a duty cycle (also referred to herein as a first duty cycle, a second duty cycle, and a third duty cycle, respectively). As depicted, the duty cycle for phase C is zero and the duty cycle for phase A is greater than the duty cycle for phase B. For example, the duty cycles illustrated in FIG. 4B may be derived from edge reduced command signal 340 at angle 402.

Figure 5:
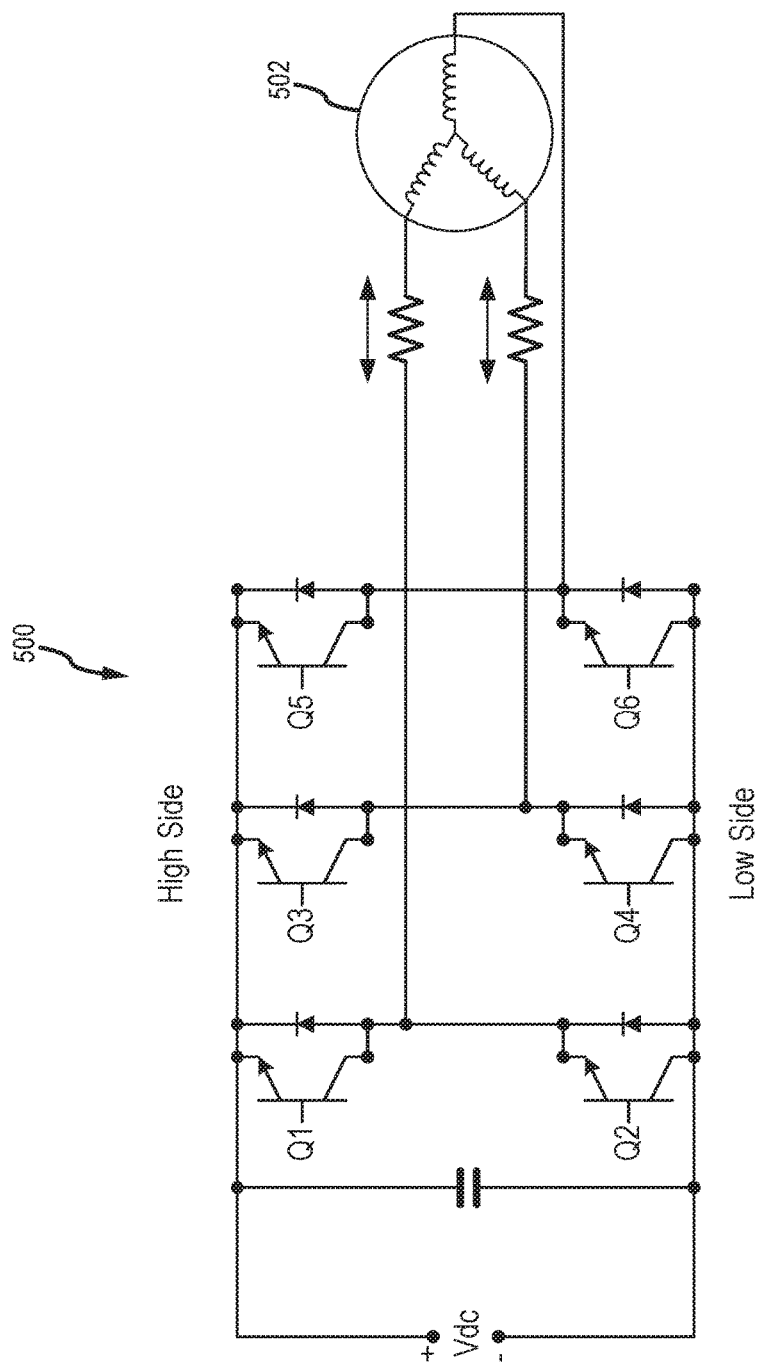
FIG. 5 illustrates a schematic view of a motor in electronic communication with a bridge inverter, in accordance with various embodiments.

With reference to FIG. 5, edge reduced command signal 340 may be sent to bridge inverter 500. Edge reduced command signal 340 may control the transistors (i.e., Q1, Q2, Q3, Q4, Q5, and Q6) in bridge inverter 500, thereby controlling motor 502. In various embodiments, motor 502 may be similar to actuator motor 102. In various embodiments, bridge inverter 500 may comprise a three phase H-bridge topology.

Figure 6:
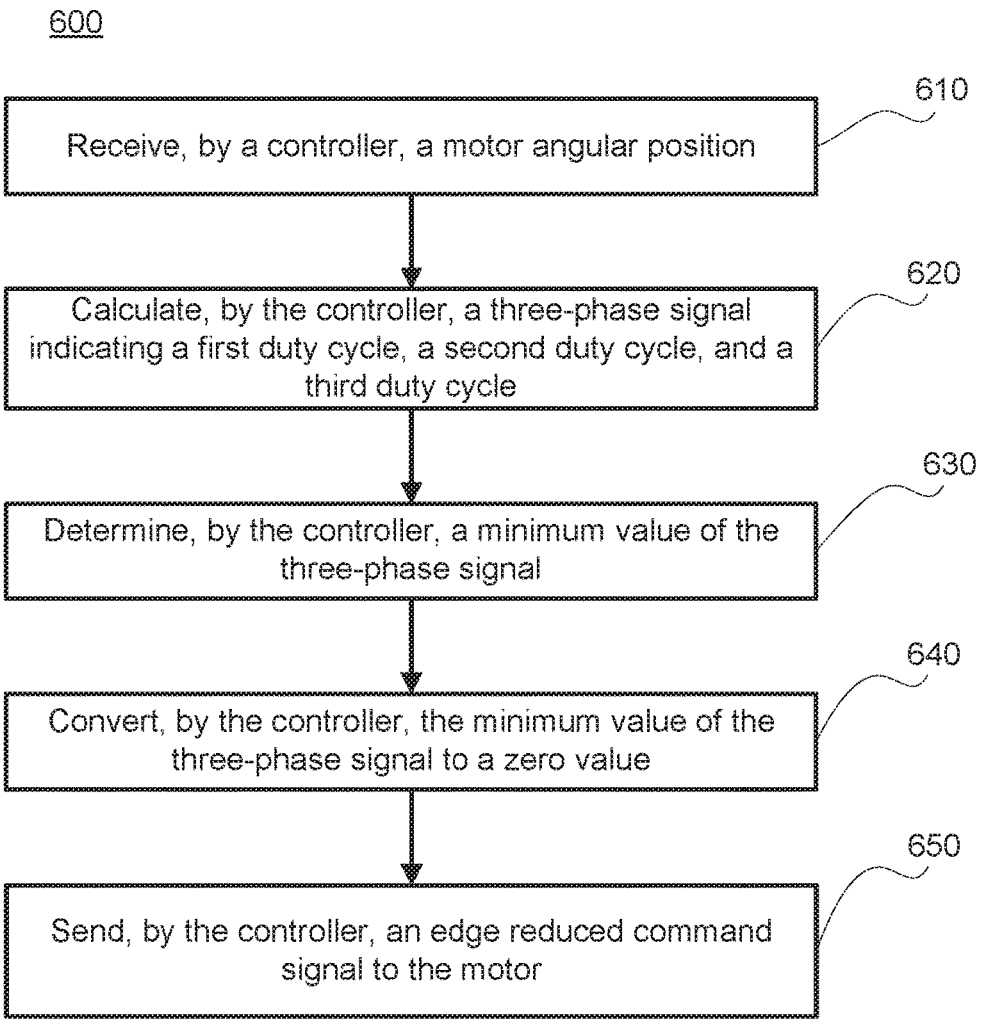
FIG. 6 illustrates a method of operating a motor, in accordance with various embodiments.

With reference to FIG. 6, a method 600 for controlling a motor is illustrated, in accordance with various embodiments. Method 600 includes receiving, by a controller, a motor angular position (step 610). Method 600 includes calculating, by the controller, a three-phase signal having a first phase, a second phase, and a third phase (step 620). Method 600 includes determining, by the controller, a minimum value of the three-phase signal (step 630). Method 600 includes converting, by the controller, the minimum value of the three-phase signal to a zero value (step 640). Method 600 includes sending, by the controller, an edge reduced command signal to the motor (step 650).

With combined reference to FIG. 3 and FIG. 6, step 610 may include receiving, by controller, a motor angular position. Step 620 may include calculating, by controller 210, three-phase DC signal 312 having first phase signal 314, second phase signal 315, and third phase signal 316. Step 630 may include determining, by controller 210, minimum value 333 of three-phase DC signal 312. Step 640 may include converting, by controller 210, the minimum value of three-phase DC signal 312 to a zero value. Step 650 may include sending, by controller 210, edge reduced command signal 340 to motor 502, with momentary reference to FIG. 5.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A controller for a brake, comprising:
    a tangible, non-transitory memory configured to communicate with the controller, the tangible, non-transitory memory having instructions stored thereon that, in response to execution by the controller, cause the controller to perform operations comprising:
        receiving, by the controller, a three-phase signal indicating a first duty cycle for a first phase signal, a second duty cycle for a second phase signal, and a third duty cycle for a third phase signal;
        determining, by the controller, a minimum value based upon the first phase signal, the second phase signal, and the third phase signal; and
        converting, by the controller, the minimum value to a zero value,
        wherein converting the minimum value to the zero value includes subtracting the minimum value from the three-phase signal.

2. The controller of claim 1, wherein at least one of the first phase signal, the second phase signal, and the third phase signal comprises the minimum value.

3. The controller of claim 2, wherein the three-phase signal is converted to an edge reduced command signal in response to the converting.

4. The controller of claim 3, wherein the controller outputs the edge reduced command signal to a bridge inverter.

5. The controller of claim 4, wherein the controller is further configured to multiply at least one of the first duty cycle, the second duty cycle, or the third duty cycle by one half of a direct current (DC) voltage.

6. The controller of claim 5, further comprising a field oriented control (FOC) logic.

7. The controller of claim 6, wherein the controller further comprises an edge reduction module configured to receive the three-phase signal from the FOC logic.

8. The controller of claim 4, wherein the controller controls a motor via the edge reduced command signal.

9. A brake arrangement, comprising:
a motor;
a controller in electronic communication with the motor; and
a tangible, non-transitory memory configured to communicate with the controller, the tangible, non-transitory memory having instructions stored thereon that, in response to execution by the controller, cause the controller to perform operations comprising:
receiving, by the controller, a motor angular position;
calculating, by the controller, a three-phase signal indicating a first duty cycle for a first phase signal, a second duty cycle for a second phase signal, and a third duty cycle for a third phase signal;
determining, by the controller, a minimum value based upon the first phase signal, the second phase signal, and the third phase signal; and
converting, by the controller, the minimum value to a zero value,
wherein converting the minimum value to the zero value includes subtracting the minimum value from the three-phase signal.

10. The brake arrangement of claim 9, further comprising:
a current sensor, in communication with the controller; and
a position sensor, in communication with the controller and configured to measure the motor angular position.

11. The brake arrangement of claim 9, wherein the controller comprises:
an edge reduction module; and
a field oriented control (FOC) logic.

12. The brake arrangement of claim 9, further comprising an electro-mechanical brake actuator (EBA), wherein the motor is for the EBA.

13. The brake arrangement of claim 12, wherein the three-phase signal is converted to an edge reduced command signal in response to the converting.

14. The brake arrangement of claim 13, wherein the tangible, non-transitory memory causes the controller to perform operations further comprising sending, by the controller, the edge reduced command signal to the motor.

15. The brake arrangement of claim 14, wherein the EBA is configured to apply a force to a pressure plate according to the edge reduced command signal.

16. The brake arrangement of claim 9, wherein the controller comprises an electro-mechanical brake actuator controller.

17. The brake arrangement of claim 9, wherein the tangible, non-transitory memory causes the controller to perform operations further comprising receiving, by the controller, a voltage command.

18. The brake arrangement of claim 17, wherein the three-phase signal is calculated based upon the voltage command and the motor angular position.

19. A method of controlling a motor, comprising:
receiving, by a controller, a motor angular position;
calculating, by the controller, a three-phase signal indicating a first duty cycle for a first phase signal, a second duty cycle for a second phase signal, and a third duty cycle for a third phase signal;
determining, by the controller, a minimum value based upon the first phase signal, the second phase signal, and the third phase signal; and
converting, by the controller, the minimum value to a zero value,
wherein converting the minimum value to the zero value includes subtracting the minimum value from the three-phase signal.

20. The method of claim 19, further comprising:
sending, by the controller, an edge reduced command signal to the motor, wherein the three-phase signal is converted to the edge reduced command signal in response to the converting; and
rotating a motor shaft in response to the sending.

* * * * *